(12) United States Patent
Ziech et al.

(10) Patent No.: US 9,242,556 B2
(45) Date of Patent: Jan. 26, 2016

(54) TRANSAXLE WITH TANDEM AXLE

(71) Applicant: Dana Heavy Vehicle Systems Group, LLC, Maumee, OH (US)

(72) Inventors: James F. Ziech, Kalamazoo, MI (US); Timothy J. Morscheck, Portage, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 14/203,684

(22) Filed: Mar. 11, 2014

(65) Prior Publication Data

US 2014/0274537 A1  Sep. 18, 2014

Related U.S. Application Data

(60) Provisional application No. 61/776,850, filed on Mar. 12, 2013.

(51) Int. Cl.
  *B60K 17/36* (2006.01)
  *B60K 17/16* (2006.01)
(52) U.S. Cl.
  CPC ............... *B60K 17/36* (2013.01); *B60K 17/16* (2013.01); *B60G 2200/14* (2013.01); *B60G 2200/22* (2013.01); *B60G 2204/419* (2013.01); *B60G 2300/026* (2013.01); *B60G 2300/0262* (2013.01); *B60Y 2306/09* (2013.01)

(58) Field of Classification Search
  CPC .... B60K 17/36; B60K 17/16; B60K 17/3467; B60K 17/3462; B60K 17/00; B60K 23/0808; B60G 2300/0262; B60G 2300/026
  USPC .................... 180/24.09, 24.11; 475/221, 198; 280/676
  See application file for complete search history.

(56) References Cited

U.S. PATENT DOCUMENTS

| | | | |
|---|---|---|---|
| 1,933,667 A | 11/1933 | Fageol | |
| 2,395,108 A | 2/1946 | Donley et al. | |
| 2,875,644 A | 3/1959 | Mancini | |
| 3,977,693 A | 8/1976 | Gamaunt | |
| 4,159,751 A | 7/1979 | Garman | |
| 5,927,422 A * | 7/1999 | Schakel | 180/197 |
| 6,085,853 A * | 7/2000 | Wernick | 180/24.09 |
| 6,634,446 B2 | 10/2003 | Ima | |
| 2004/0176206 A1* | 9/2004 | Oates et al. | 475/221 |
| 2006/0030448 A1* | 2/2006 | Almaguer | 475/231 |
| 2012/0205182 A1* | 8/2012 | Rindfleisch | 180/338 |

FOREIGN PATENT DOCUMENTS

WO  WO 2013032477 A1 *  3/2013

* cited by examiner

*Primary Examiner* — Keith Frisby
(74) *Attorney, Agent, or Firm* — Marshall & Melhorn, LLC

(57) ABSTRACT

A transaxle with a tandem axle includes an engine, a transmission and a driveshaft. The transmission has an integrated interaxle differential mounted remotely from the engine. The transmission and the integrated interaxle differential are mounted on at least one vehicle frame member so that both are sprung weight on the vehicle. The driveshaft spans a gap between the engine and the transmission.

11 Claims, 6 Drawing Sheets

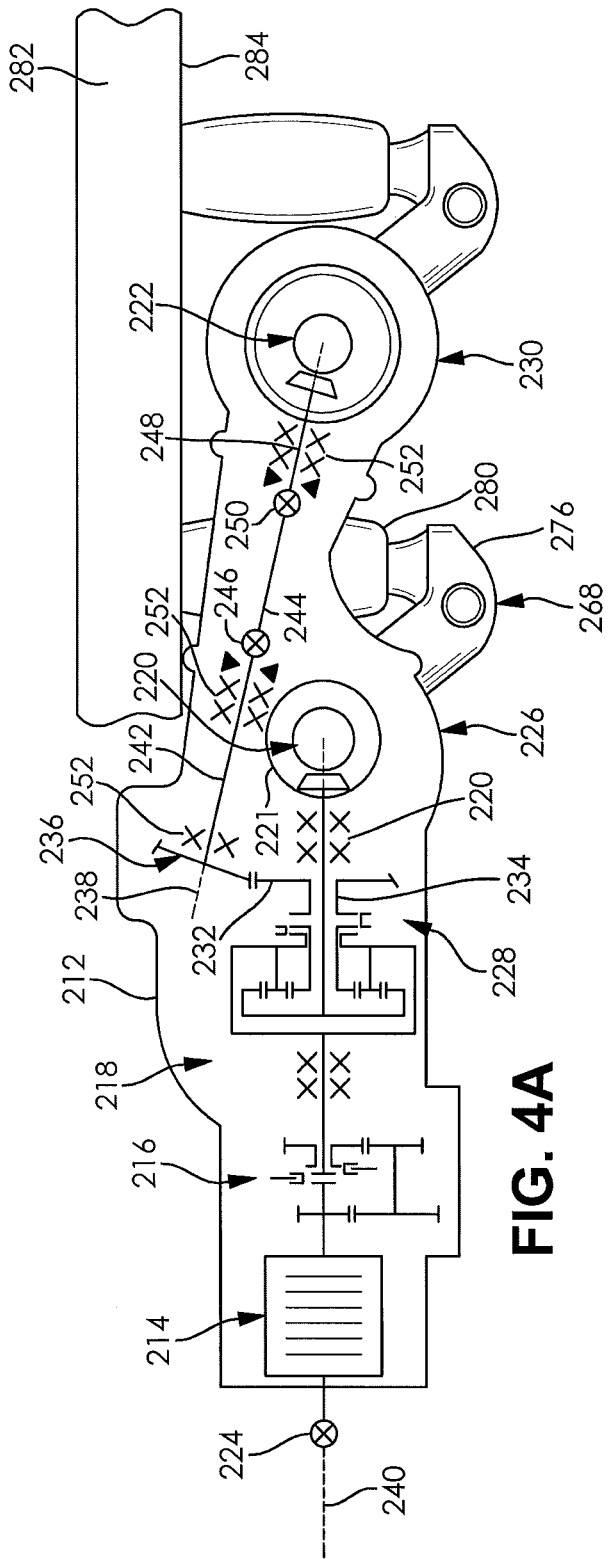
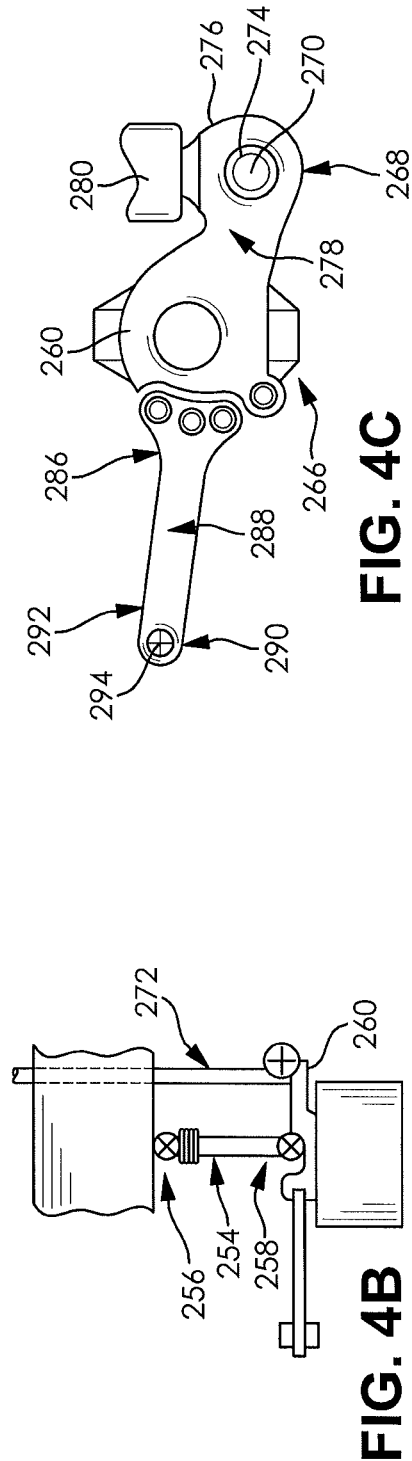
FIG. 4A
FIG. 4B
FIG. 4C

TRANSAXLE WITH TANDEM AXLE

RELATED APPLICATIONS

This application claims the benefit from U.S. Patent Provisional Application Ser. No. 61/776,850 under 35 USC 119 (e) filed on Mar. 12, 2013, which is incorporated by reference in its entirety.

BACKGROUND OF THE INVENTION

The typical class 8 truck driveline uses a transmission physically attached, such as by bolting, to the engine. A tandem drive axle utilizing an inter-axle differential is connected to the transmission with a drive axle.

The engine/transmission assembly is typically mounted on rubber-type bushings. Usually, three bushings are utilized with one bushing located at the front of the engine and the other two bushings on each side of the clutch bell housing. This arrangement requires a compromise in the engine mounting bushing stiffness since the transmission multiplied torque requires stiff bushings to support the large torque reaction but a softer bushing would reduce noise, vibration and harshness (NVH) from the engine. There is also a trend toward lower speed, higher torque engines, which will increase the loads on the engine mounts and again pushes designers toward stiffer bushings that do little for NVH. Finally, there is a need to improve the ride of class 8 trucks by reducing the tandem axle unsprung weight.

Unsprung weight as used herein is the weight of the suspension, wheels, tires and other components directly connected to them, rather than supported by the suspension. Sprung weight at used herein is the weight of the vehicle body and other components supported by the suspension.

Noise, vibration and harshness can be improved by decoupling the engine and transmission. This has the advantage of being able to mount the engine on bushings specifically tuned for the engine vibration modes without the transmission torque multiplication. A transmission mounted remotely from the engine on the vehicle frame could also utilize tuned bushing mounts for the transmission vibration modes. This remote transmission location could incorporate part of the tandem axle components, such as the inter-axle differential. This would reduce the tandem unsprung weight for improved ride characteristics. Since the remote mounted transmission is more difficult to shift manually, an automated transmission shift control could be used. To further reduce the tandem axle unsprung weight, the tandem axle wheel differentials could be integrated into the frame mounted transaxle assembly and a De Dion type axle and suspension system utilized or a fully independent suspension system used in conjunction with the transaxle unit.

SUMMARY OF THE PRESENT DISCLOSURE

A transaxle with a tandem axle includes an engine, a transmission and a driveshaft. The transmission has an integrated interaxle differential mounted remotely from the engine. The transmission and the integrated interaxle differential are mounted on at least one vehicle frame member so that both are sprung weight on the vehicle. The driveshaft spans a gap between the engine and the transmission.

BRIEF DESCRIPTION OF THE DRAWINGS

The above, as well as other advantages of the present invention, will become readily apparent to those skilled in the art from the following detailed description when considered in the light of the accompanying drawings in which:

FIG. 4A is a partial, schematic, cut away side view of yet another alternative driveline;

FIG. 4B is a partial, schematic top view of a portion of the structure shown in FIG. 4A;

FIG. 4C is a partial, schematic side view of a portion of the structure shown in FIGS. 4A and 4B.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts of the present invention. Hence, specific dimensions, directions or other physical characteristics relating to the embodiments disclosed are not to be considered as limiting, unless expressly stated otherwise.

Figure 1A:
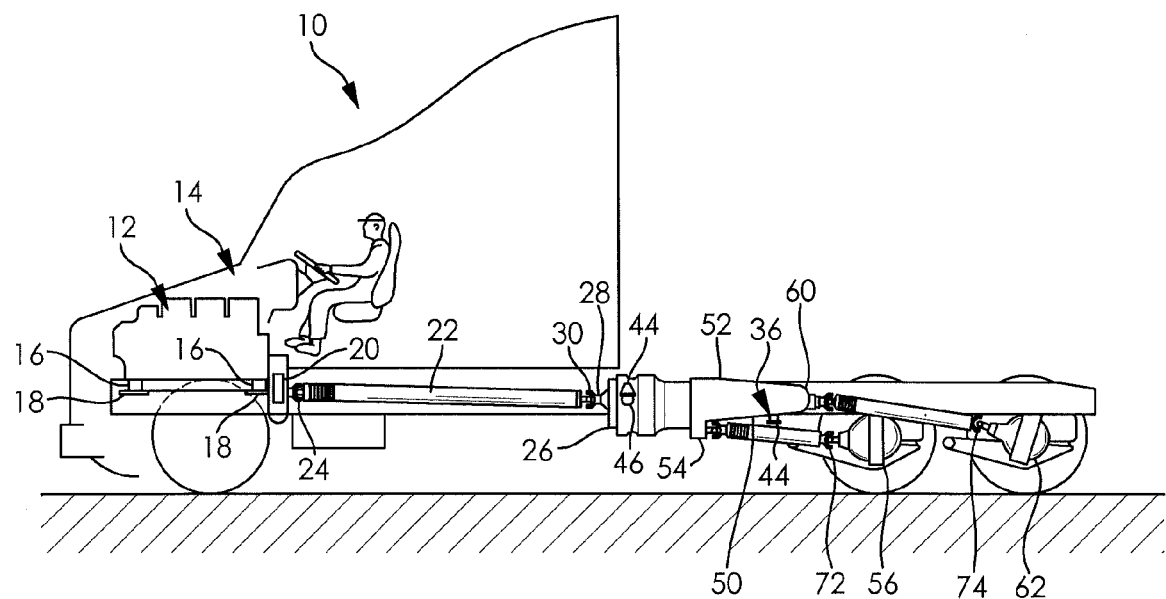
FIG. 1A is a partial, schematic cut away side view of a vehicle and a driveline for the vehicle.
Figure 1B:
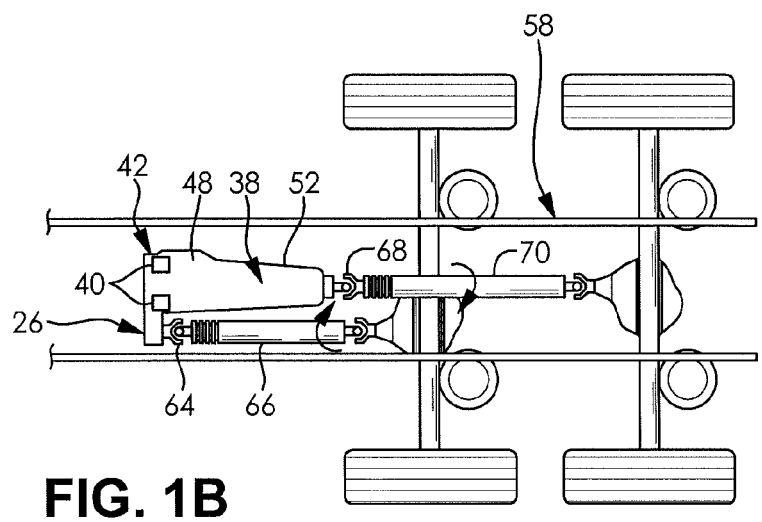
FIG. 1B is a partial, schematic plan view of a portion of the vehicle and driveline depicted in FIG. 1A.

Turning now to FIGS. 1A and 1B, one embodiment of a semi-truck 10 is schematically depicted in partial cross-section side view and top view, respectively. The side view depicts an engine 12 located in an engine compartment 14 of the truck 10. The engine 12 is mounted on a first set of bushings 16 tuned to dampen vibrations from the engine 12. The bushings 16 are located between the engine 12 and one or more engine mounts 18. An engine output shaft 20 is connected to a driveshaft 22, such as by a U-joint 24. The driveshaft 22 translates the rotation from the engine 12 to a remote mounted transmission 26. The driveshaft 22 connects to a transmission input shaft 28, such by a U-joint 30.

As used herein, remote mounted means the transmission 26 is not bolted to the engine 12, as in the prior art. Instead, the transmission 26 is physically separated from the engine 12, such that there is a gap 32 between them. The gap 32 is spanned by the driveshaft 22. And, the driveshaft 22 is connected at one end to the engine and at the other end to the transmission 26 via the joints 24, 30 or similar devices.

The transmission 26 is supported on a chassis with transmission specific bushings, or isolators. Any number of bushings may be used and they may be located in various locations to support the transmission 26. In FIG. 1B, three bushings are identified. A first bushing 36 may be located adjacent a transmission output portion 38 while two additional bushings 40 may be located adjacent a transmission input portion 42. The three bushings 36, 40 roughly form a triangle. It can be appreciated, however, that the bushings 36, 40 can be located in other patterns.

The bushings 36, 40 comprise a base 44, such as a mount, and a selectively deformable portion 46, which functions to isolate vibration. In FIG. 1B, the forward bushings 40 may have their deformable portion 46 below the base 44. Thus, the deformable portion 46 is located between an upper surface 48 of the transmission 26 and the base 44, where the base 44 is connected to the chassis 34. The rearward bushing 36 may have its deformable portion 46 located above the base 44. For this bushing 36, the base 44 is connected above the chassis 34 and the deformable portion 46 is located between the base 44 and a lower surface 50 of the transmission 26.

Unlike the prior art designs where the transmission was bolted to the engine and the transmission and the engine shared the same bushings, which were tuned to either the transmission or engine, the transmission bushings 36, 40 in FIGS. 1A and 1B can be tuned to the transmission 26 only. Bushings tuned to the transmission vibration modes result in more efficient transmission vibration mode dampening than bushings attempting to dampen separate vibration modes from the engine and transmission.

A tandem axle power divider inter-axle differential (IAD) 52 is integrated into the transmission 26. In FIGS. 1A and 1B, the IAD 52 is depicted as being located in direct contact with and behind the transmission 26. In that embodiment, the IAD 52 is physically connected, such as by bolting, to the transmission 26. The IAD 52 may comprise a differential lock mechanism, if it is required.

As can be appreciated from FIGS. 1A and 1B, the IAD 52 has two separate outputs: a first output 54 for a forward tandem axle 56 of a tandem axle set 58 and a second output 60 for a rear tandem axle 62 of the tandem axle set 58. A first U-joint 64 is located between the first output 54 and a first output shaft 66. A second U-joint 68 is located between the second output 60 and a second output shaft 70. A third U-joint 72 connects the first output shaft 66 with the forward tandem axle 56. A fourth U-joint 74 connects the second output shaft 70 with the rear tandem axle 62.

The first and second output shafts 66, 70 can be aligned to somewhat follow the axle suspension movements so as to minimize the shaft first and second output 66, 70 joint angles. The two output shafts are substantially the same with the principal difference being the location of the differential ring gears being on opposite sides of the respective ring gears, which can be appreciated from FIG. 2A.

Figure 2A:
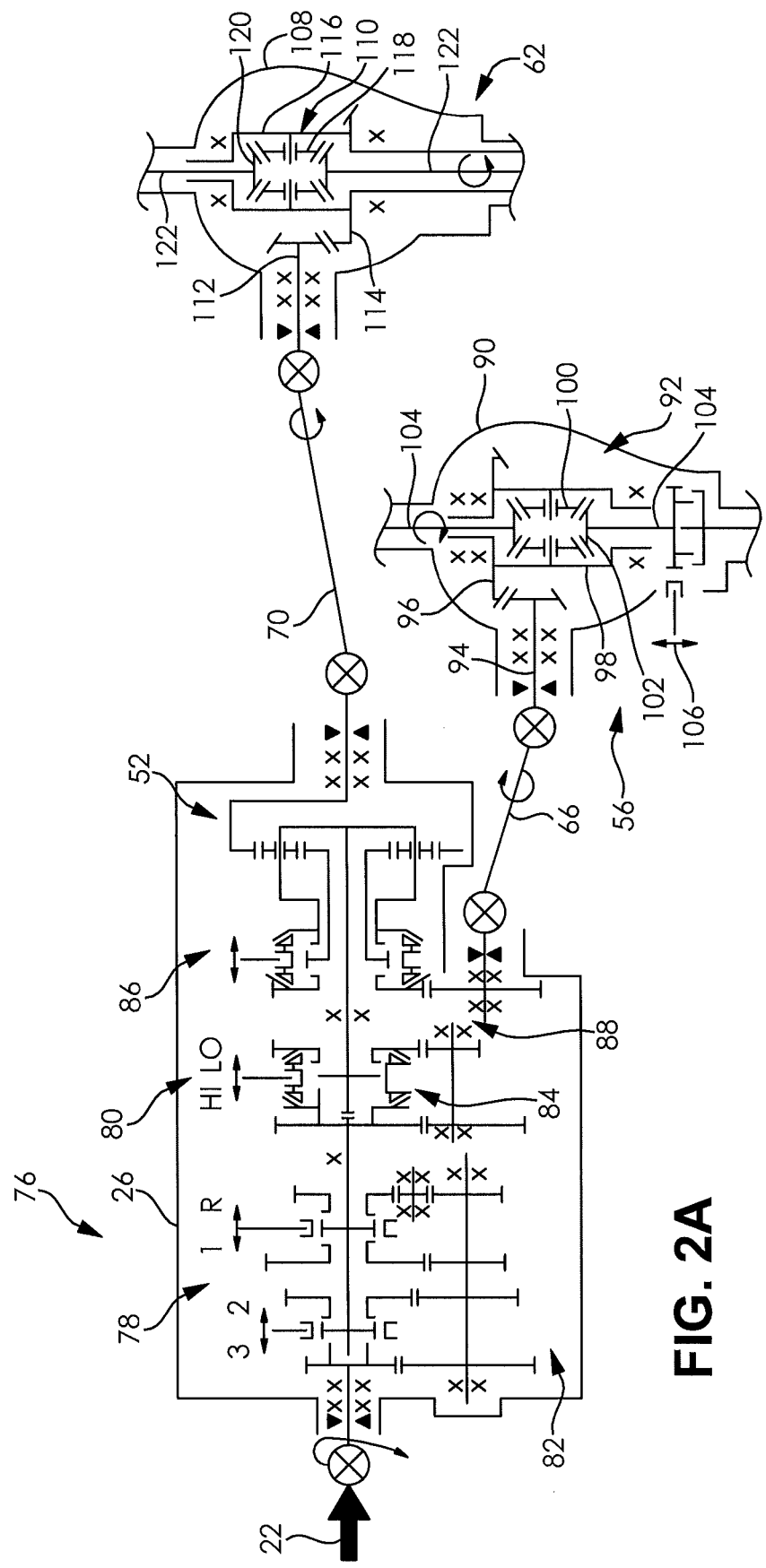
FIG. 2A is a partial, schematic cut away plan view of a portion of the driveline depicted in FIGS. 1A and 1B.

FIG. 2A provides further details on one embodiment of a remote mounted transmission 26. The transmission 26 receives rotational input from the driveshaft 22. A forward portion 76 of the transmission 26 is comprised of direction gears 78, range gears 80 and speed gears 82. The direction gears 78 comprise forward and reverse. The speed gears 82 may comprise gears 1, 2 and 3, but others are permissible as well. It can be appreciated that a direction gear 78 in the transmission 26 can be selected and then a speed in that direction can be selected by choosing speed gears 1, 2 or 3 or reverse (R), for example.

The range gears 80 may comprise a high and low range. When used in combination with the speed gears 82 and direction gears 78, a compound 6 speed forward and 2 speed reverse output is realized. An additional ratio can be incorporated into the tandem axle 58 resulting in 7 forward speeds overall.

The transmission also comprises a first clutch 84. The first clutch 84 may be a range clutch for selecting between a high mode and a low mode. The first clutch 84 may be such as a cone-type synchronizer.

The output of the first clutch 84 may be connected to a second clutch 86. The second clutch 86 may also be such as a cone-type synchronizer. The second clutch 86 selectively engages and disengages the forward tandem axle 56. Thus, it can be appreciated that the second clutch 86 selectively switches the vehicle between 6×2 and 6×4 modes. The determination for switching between the two modes can be driver controlled and/or determined by a computer based on vehicle load, fuel efficiency parameters, throttle position, available traction and/or vehicle speed.

In the depicted embodiment, a drop gear set 88 is used to connect the second clutch 86 with the first output shaft 66. The first output shaft 66 is rotationally connected from the transmission 16 to the forward tandem axle 56.

The forward tandem axle 56 comprises a housing 90 with a differential 92 therein. The differential 92 comprises a pinion shaft 94 driving a ring gear 96 connected to a differential housing 98. Pinion gears 100 and side gears 102 are located in the housing 98. Axle half shafts 104 are connected to the side gears 102 for selective differentiation between them. A dog type clutch 106 may be located on one of the half shafts 104 for selection between 6×2 and 6×4 mode.

The output of the first clutch 84 is also connected to the interaxle differential 52. In the depicted embodiment, the IAD 52 is a sun/planetary type differential. The output of the differential 52 is connected to the rear tandem axle 62, such as through the second output shaft 70. The planetary IAD 52 can divide the torque between the forward tandem axle 56 and the rear tandem axle 62 in any ratio.

The rear tandem axle 62 comprises a housing 108 with a differential 110 therein. The differential 110 comprises a pinion shaft 112 driving a ring gear 114 connected to a differential housing 116. Pinion gears 118 and side gears 120 are located in the housing 116. Axle half shafts 122 are connected to the side gears 120 for selective differentiation between them.

The gear ratios provided in the forward and rear tandem axles 56, 62 may be selected based on the desired needs and efficiency of the vehicle. In the depicted embodiment, the forward tandem axle 56 may be provided with a 5.57:1 ratio while the rear tandem axle 62 may be provided with a 2.25:1 ratio. The resultant effective 6×3 axle ratio using a 70/30 torque split IAD is then 3.25:1 (70% 2.25+30% 5.57).

Figure 2B:
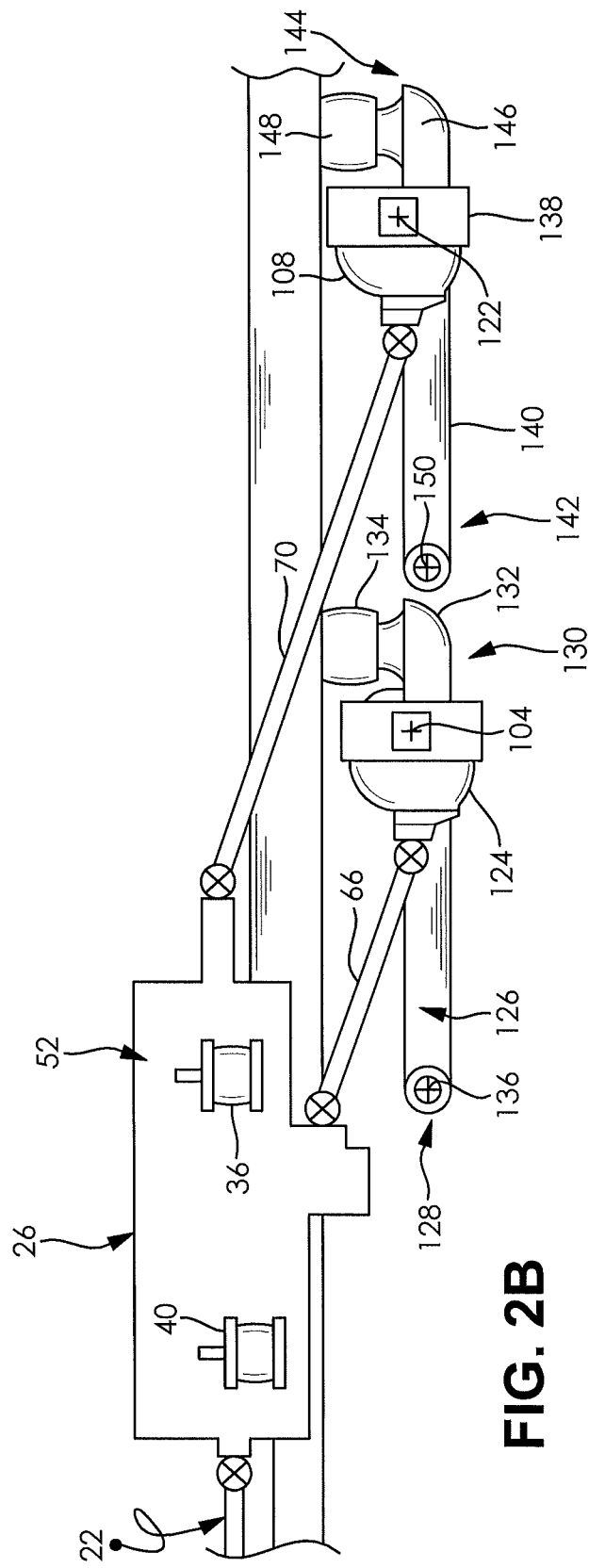
FIG. 2B is a partial, schematic cut away side view of the structures shown in FIG. 2A.

FIG. 2B schematically depicts a side view of the transmission 26 and inter-axle differential 52 shown in FIG. 2A. The first and second output shafts 66, 70 are also shown connecting the transmission/IAD 26, 52 with the forward tandem axle 56 and the rear tandem axle 62, respectively.

As can be appreciated from both FIGS. 2A and 2B, an axle half shaft 104 from the forward tandem axle 56 extends through a forward spindle housing 124. The forward spindle housing 124 is connected to a trailing arm 126. The trailing arm 126 has a forward portion 128 and a rear portion 130. The rear portion 130 supports an air spring pedestal 132. An air spring 134 is located on the pedestal 132 for connection with the vehicle chassis 34. The forward portion 128 of the trailing arm 126 may be pivotally connected to the chassis 34, such as through a pivot type mount 136.

Similarly, an axle half shaft 122 from the rear tandem axle 62 extends through a rear spindle housing 138. The rear spindle housing 138 is connected to a trailing arm 140. The trailing arm 140 has a forward portion 142 and a rear portion 144. The rear portion 144 supports an air spring pedestal 146. An air spring 148 is located on the pedestal 146 for connection with the vehicle chassis 34. The forward portion 142 of the trailing arm 140 may be pivotally connected to the chassis 34, such as through a pivot type mount 150.

FIGS. 2A and 2B depict trailing arms 126, 140 on one side of the vehicle. The other side of the vehicle has a similar, if not identical, arrangement.

Based on the foregoing, it can be appreciated that the remote mounted transmission 26 with its interaxle differential 52, attached to the vehicle frame, reduces the unsprung weight of the vehicle. Reduction in the unsprung weight means there is less weight on the tires of the vehicle which enables them to readily adapt to variations in the road thus giving them better grip on the road. In contrast, a wheel more heavily loaded will not absorb variations in the road as well and will undesirably translate the road irregularities or variations to the vehicle.

Figure 3:
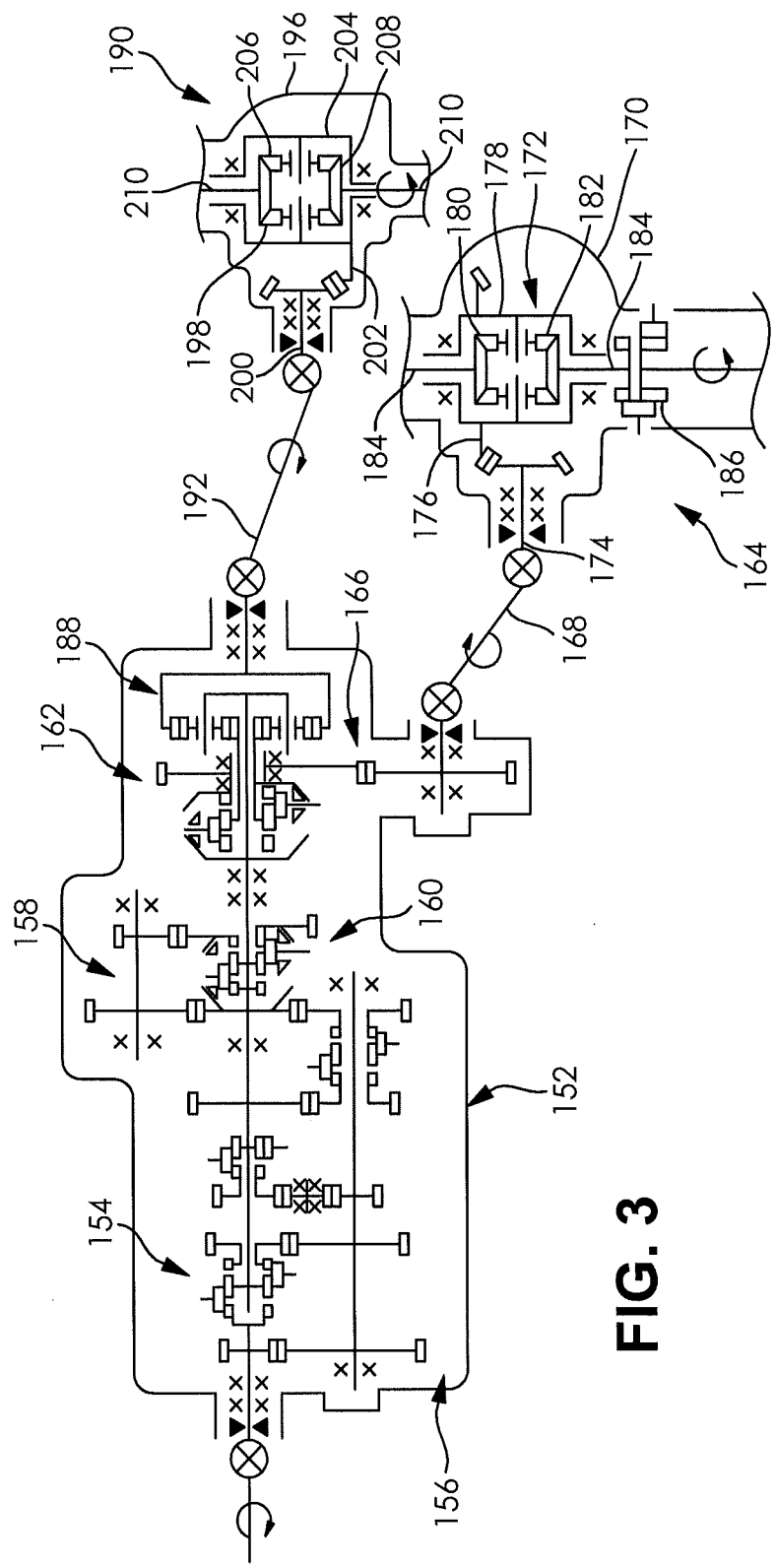
FIG. 3 is a partial, schematic cut away plan view of an alternative driveline.

FIG. 3 depicts yet another embodiment wherein a transmission 152 is comprised of direction gears 154 and speed gears 156. The direction gears 154 comprise forward and reverse. The speed gears 156 may comprise gears 1, 2, 3 and 4 but others are permissible as well. It can be appreciated that a direction gear 154 in the transmission 152 can be selected and then speed in that direction can be selected by choosing gears 1, 2, 3 or 4. A range box 158 is included for high and low ratios compounded with the speed gears 156, and the direction gears 154.

A first clutch 160 is included in the transmission 152. The clutch 160 may be a range clutch for selecting between a high mode and a low mode. The clutch 160 may be such as a cone-type synchronizer.

The output of the first clutch 160 may be connected to a second clutch 162. The second clutch 162 may also be such as a cone-type synchronizer. The second clutch 162 selectively engages and disengages a forward tandem axle 164. Thus, it can be appreciated that the second clutch 162 switches the vehicle between 6×2 and 6×4 modes. The determination for switching between the two modes can be driver controlled and/or determined by a computer based on vehicle load, fuel efficiency parameters, throttle position, available traction and/or vehicle speed.

In the depicted embodiment, a drop gear set 166 is used to connect the second clutch 162 with a first output shaft 168. The first output shaft 168 is rotationally connected from the transmission 152 to the forward tandem axle 164.

The forward tandem axle 164 comprises a housing 170 with a differential 172. The differential 172 comprises a pinion shaft 174 driving a ring gear 176 connected to a differential housing 178. Pinion gears 180 and side gears 182 are located in the housing 178. Axle half shafts 184 are connected to the side gears 182 for selective differentiation between them. A dog type clutch 186 may be located on one of the half shafts 184 for selection between 6×2 and 6×4 mode.

The first clutch 160 is connected to an interaxle differential 188. In the depicted embodiment, the IAD 188 is a sun/planetary type differential. The output of the differential 188 is connected to a rear tandem axle 190, such as through a second output shaft 192.

The rear tandem axle 190 comprises a housing 196 with a differential 198. The differential 198 comprises a pinion shaft 200 driving a ring gear 202 connected to a differential housing 204. Pinion gears 206 and side gears 208 are located in the housing 204. Axle half shafts 210 are connected to the side gears 208 for selective differentiation between them.

FIGS. 4A-4C depict another embodiment wherein a housing 212 is depicted. The housing 212 encloses a plurality of structures including a transmission 214, a range box 216, an interaxle differential 218, a forward tandem differential 220 and a rear tandem differential 222. The housing 212 may be one piece or multiple pieces connected together, such as by bolting or welding. Assembly method of the housing 212 aside, it is preferred that the above-mentioned elements be housed together, such as depicted in FIG. 4A, to reduce the unsprung weight of the vehicle.

An input 224 is provided to the housing 212, such as through a driveshaft (not shown) extending from an engine (not shown). The input 224 is connected to the transmission 214, which may comprise the same speed and direction components described in FIGS. 2 and 3 above. The output of the transmission is connected to the range box 216. The range box 216 uses a clutch 228 to select between high and low settings.

The output of the range box 216 rotates the interaxle differential 218. In the depicted embodiment, the IAD 218 is a sun/planetary type differential, but other differentials are permissible. The differential 218 is connected to a forward tandem axle 226, which may have the features of the forward tandem differential 220, which may have the features of the forward tandem depicted in FIGS. 2 and 3 and described above. The differential 218 is connected to a clutch 228 for selectively engaging a rear tandem axle 230.

The clutch 228 selectively engages a drive gear 232 that is concentric with a differential output shaft 234. The drive gear 232 may have an outer diameter portion with teeth that form a bevel gear, and may be one of a modified helical gear, a spiral bevel gear, a beveloid gear, and a straight bevel gear. The drive gear 232 is drivingly engaged with a driven gear 236.

The driven gear 236 is located on the outer diameter portion of the drive gear 232. More particularly, the driven gear 236 is not concentric with the drive gear 232 but instead it is in contact with a discrete location of the outer diameter portion of the drive gear 232. Preferably, the driven gear 236 is engaged with just the top of the drive gear 232. This location elevates a rotational axis of the driven gear 236 above the drive gear 232 and the other components of the forward tandem differential 220. The driven gear 236 may be one of a modified helical gear, a spiral bevel gear, a beveloid gear and straight bevel gear.

The bevel of either, or both, of the drive gear 232 and/or the driven gear 236 results in the driven gear axis 238 to be non-parallel to an axis 240 of the input 224.

The driven gear 236 is disposed on a driven shaft 242. The driven shaft 242 may be connected to an inter-axle shaft 244, such as by a U-joint 246. The inter-axle shaft 244 may be connected to a rear pinion shaft 248 on the opposite end, also such as by a U-joint 250. The rear pinion shaft 248 may be collinear with the inter-axle shaft 244.

Bearings 252 disposed about the driven gear shaft 242 and the inter-axle shaft 244 support them for rotation within the housing 212. The driven gear shaft 242 is oriented substantially parallel and substantially co-axial with the axis 238 of the driven gear 236.

The rear tandem differential 222 may be comprised of the components depicted in FIGS. 2 and 3 and described above.

A first axle half shaft 254 extends from the housing 212, as shown in FIG. 4B. The first axle half shaft 254 is connected to the forward tandem differential 220 at an inboard end 256. An outboard end 258 of the half shaft 254 extends through a spindle housing 260. It can be appreciated that a second axle half shaft (not shown) extends from the forward tandem differential 220 and extends to a second spindle housing (not shown) on the opposite side of the differential in the same manner. Similarly, axle half shafts extend from the rear tandem differential in the outboard direction to the spindle housings (not shown).

As seen in FIG. 4C, the spindle housing 260 has a forward portion 266 and a rear portion 268. The portions 266, 268 may be unitary and integrally formed or they may be separate components that are attached by welding, fasteners or the like.

The rear portion 268 of the spindle housing 260 includes an aperture 270 for receiving a cross tube 272. As can be appreciated in FIGS. 4B and 4C, the tube 272 extends into the aperture 270 and is fixed to a wall 274 defining the aperture 270, such as by welding. As shown in FIG. 4, the cross tube 272 extends from its mount, parallel the axle half shaft 254 and continuously under the housing 212 to a second spindle housing (not shown) on the other side of the housing 212 opposite the first spindle housing 260.

The aperture 270, and thus the cross tube 272, are located below and behind the axle half shaft 254, which can be seen in FIGS. 4B and 4C.

The rear portion 268 of the spindle housing 260 forms an air spring pedestal 276 on an upper portion 278 thereof. A forward air spring 280 is located between the pedestal 276 and a chassis member 282. The forward air spring 280 can be appreciated in FIG. 4A which depicts a forward air spring on the other side of the housing 212. The forward air spring 280 is located in contact with a lower surface 284 of the chassis member 282.

A rear portion 286 of a trailing arm flex plate 288 is connected to the forward portion 266 of the spindle housing 260. The trailing arm flex plate 288 may be unitary and integrally formed with the housing 260 or it may be a separate component that is attached by welding, fasteners or the like.

An aperture 290 is located in a forward portion 292 of the trailing arm flex plate 288. The aperture 290 receives a pivotal connection 294 with the chassis member 282 that permits the trailing arm flex plate 288 to move up or down and thus control the up and down movement of the wheels/tires.

Figure 4D:
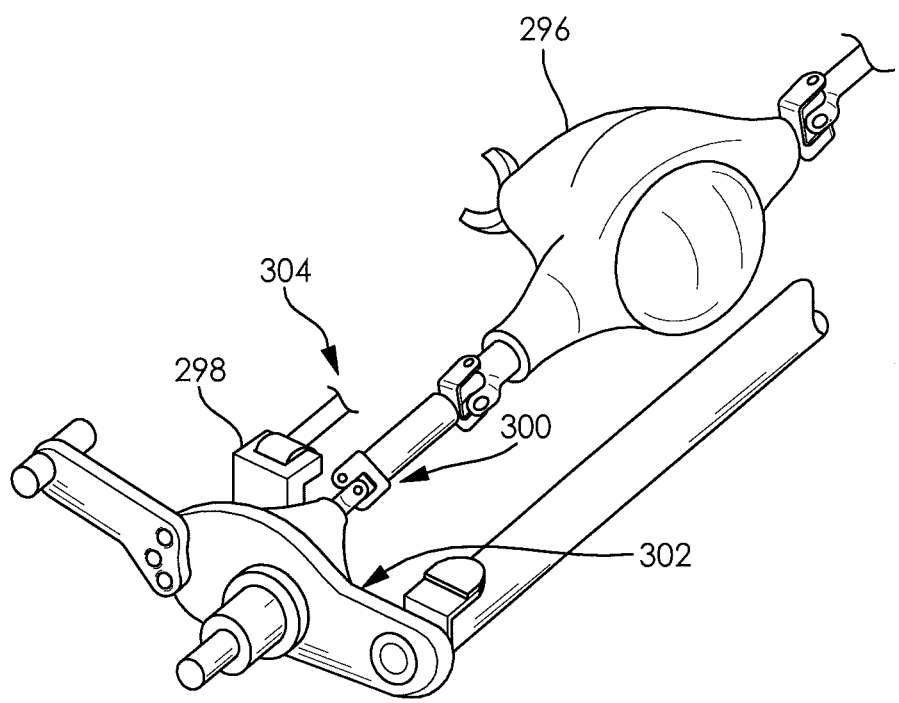
FIG. 4D is a partial, schematic perspective view of an alternative structure for the embodiment depicted in FIGS. 4A-4C.

FIG. 4D depicts a variation on the embodiment depicted in FIGS. 4A-4C. FIG. 4D depicts a rear axle differential housing 296 of a tandem (not shown), physically separate from the housing 212. Thus, the housing 296 depicted in FIG. 4A is closed after the forward tandem differential 220, but a shaft (not shown), such as the interaxle shaft discussed above, may be used to transmit rotation from the housing 212 to the rear axle differential housing 296.

The rear axle differential housing 296 has the structures described above and may also be outfitted with a track rod mount 298 connected to an inboard side 300 of the spindle housing 302. The track rod mount 298 may be connected to the spindle housing 302 by being integrally formed and unitary therewith or it may be a separate component and connected such as by welding and/or mechanical fasteners. A track rod 304 is pivotally mounted to the mount 298 as shown in the figure.

Alternately, a fully independent rear tandem suspension can be used with chassis mounted wheel differential assemblies. An additional helical gear set may be added to allow a very narrow final drive which facilitates an increase in the half shaft length consequently lowering the swept angle of the cardan joints during wheel jounce and rebound movements.

It can be appreciated that by locating the wheel differential assemblies of one or both of the axles into the transaxle assembly, the weight of the transmission, range box, interaxle differential, and forward and rear differentials can be chassis mounted, thus reducing the unsprung weight.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A transaxle with a tandem axle, comprising:
   an engine;
   a transmission with an integrated interaxle differential mounted remotely from said engine, said transmission and said integrated interaxle differential mounted on at least one vehicle frame member so that both are sprung weight on a vehicle; and
   a driveshaft spanning a gap between said engine and said transmission.

2. The transaxle with tandem axle of claim 1, wherein said interaxle differential has a first output connected to a first output shaft which is connected to a forward tandem axle.

3. The transaxle with tandem axle of claim 1, wherein a forward tandem axle does not have an interaxle differential.

4. The transaxle with tandem axle of claim 1, wherein said interaxle differential has a second output connected to a second output shaft which is connected to a rear tandem axle.

5. The transaxle with tandem axle of claim 1, wherein a forward axle half shaft is connected at an inboard end to a forward tandem axle and to a forward spindle housing at an outboard end.

6. The transaxle with tandem axle of claim 1, wherein a rear portion of a first trailing arm is fixedly connected to a forward spindle housing and a forward portion of said first trailing arm is pivotally connected to said vehicle frame member.

7. The transaxle with tandem axle of claim 1, wherein a rearward portion of a forward spindle housing defines an air spring mount.

8. The transaxle with tandem axle of claim 1, wherein a rear axle half shaft is connected at an inboard end to a rear tandem axle and to a rear spindle housing at an outboard end.

9. The transaxle with tandem axle of claim 1, wherein a rear portion of a second trailing arm is fixedly connected to a rear spindle housing and a forward portion of said second trailing arm is pivotally connected to said vehicle frame member.

10. The transaxle with tandem axle of claim 1, wherein a rearward portion of a rear spindle housing defines an air spring mount.

11. A transaxle with a tandem axle, comprising:
    an engine mounted on a first set of bushings tuned to dampen engine vibrations;
    a transmission with an integrated interaxle differential mounted remotely from said engine and on a second set of bushings tuned to dampen transmission vibrations, said bushings mounting said transmission and integrated interaxle differential on at least one frame member so that both are sprung weight on a vehicle; and
    a driveshaft spanning a gap between said engine and said transmission.

* * * * *